US012635716B2

(12) United States Patent
Aular Peralta

(10) Patent No.: US 12,635,716 B2
(45) Date of Patent: May 26, 2026

(54) DRINKABLE EGG WHITE

(71) Applicant: INTERLAAP CORPORATION, Panama City (PA)

(72) Inventor: Luis Antonio Aular Peralta, Madrid (ES)

(73) Assignee: INTERLAAP CORPORATION, Panama City (PA)

( * ) Notice: Subject to any disclaimer, the term of this patent is extended or adjusted under 35 U.S.C. 154(b) by 462 days.

(21) Appl. No.: 18/008,882

(22) PCT Filed: Aug. 5, 2021

(86) PCT No.: PCT/EP2021/071941
§ 371 (c)(1),
(2) Date: Dec. 7, 2022

(87) PCT Pub. No.: WO2022/048857
PCT Pub. Date: Mar. 10, 2022

(65) Prior Publication Data
US 2023/0309590 A1 Oct. 5, 2023

(30) Foreign Application Priority Data

Sep. 3, 2020 (EP) ..................................... 20382787
Oct. 15, 2020 (EP) ..................................... 20382904

(51) Int. Cl.
| A23L 15/00 | (2026.01) |
| A23B 5/005 | (2006.01) |
| A23J 3/04 | (2006.01) |
| A23J 3/34 | (2006.01) |

(52) U.S. Cl.
CPC ............ *A23L 15/25* (2016.08); *A23B 5/0055* (2013.01); *A23J 3/04* (2013.01); *A23J 3/341* (2013.01); *A23L 15/30* (2016.08)

(58) Field of Classification Search
CPC ....... A23L 15/25; A23L 15/30; A23B 5/0055; A23J 3/04; A23J 3/341
USPC .......................................................... 426/590
See application file for complete search history.

(56) References Cited

U.S. PATENT DOCUMENTS

| 4,984,242 A | 1/1991 | Scifres et al. |
| 2003/0008060 A1 † | 1/2003 | Hudson |
| 2015/0173394 A1 * | 6/2015 | Sandoval Huertas .. A23P 30/40 |
| | | 426/573 |

FOREIGN PATENT DOCUMENTS

| EP | 0334057 A2 | 8/1989 |
| EP | 0521331 A2 | 1/1993 |
| EP | 1685764 A1 | 8/2006 |
| EP | 1867237 A1 | 12/2007 |
| WO | 9604800 A1 | 2/1996 |

(Continued)

OTHER PUBLICATIONS

Search Report and Written Opinion for PCT/EP2021/071941, dated Nov. 17, 2021, 9 pages.

(Continued)

*Primary Examiner* — Brent T O'Hern
(74) *Attorney, Agent, or Firm* — Kurt T. Mulvil; VLP Law Group LLP

(57) ABSTRACT

The invention relates to a liquid egg white, with novel organoleptic and texture and/or rheological characteristics. It also relates to the methods to produce it and to compositions and food products comprising it.

20 Claims, 9 Drawing Sheets

(56) References Cited

FOREIGN PATENT DOCUMENTS

| WO | WO2005074703 A1 † | 8/2005 |
| WO | 2007011685 A2 | 1/2007 |
| WO | WO2012146717 A1 † | 11/2012 |

OTHER PUBLICATIONS

Tóth, A., Németh, C., Csurka, T., Surányi, J., Badak-Kerti, K., Penksza, P., &Friedrich, L.. Development of high protein containing bakery filling. Review on Agriculture and Rural Development, 8(1-2), 74-80 (2019).†
Capriovus Product Specification of ToTu egg-white cottage cheese, ToTu egg-white cream, ToTu egg-white cream extra and ToTu milk made of egg white, published May 26, 2020.†
Rage of Egg products designed for the needs of the hospitality industry and worskhops (https://www.retailactual.com/productos/20150203/Pascual-ovoproducto-yema-huevo-liquido); published Feb. 3, 2015 by Retail Actual.†
The new "milk", of animal origin and 100% protein, published Feb. 20, 2020 by Alvaro Hermida (https://www.alimente.elconfidencial.com/consumo.2020-02-20/leche-huevo-invento-espanol_2461908/).†
Ice creams that do not melt and fat-free chocolates, thanks to the hydrolysis of the egg, published Apr. 29, 2015 (htts://cadenaser.com/ser/2015/04/29/gastro/1430318631_399600.hml).†
Garcés-Rimón, M., Sandoval, M., Molina, E., López-Fandiño, R., &Miguel, M. "Egg protein hydrolysates: New culinary textures". International Journal of Gastronomy and Food Science, 3, 17-22 (2016).†

* cited by examiner
† cited by third party

DRINKABLE EGG WHITE

BACKGROUND OF THE INVENTION

The present invention falls within the food sector, specifically it relates to a liquid egg white with improved organoleptic properties.

FIELD OF INVENTION

The circumstances of chronic or temporary illness that lead a person to not include or eliminate animal milk, in particular cow's milk, its derivatives and all the products that include this food in their daily diet are diverse. Casein allergy and lactose intolerance are the most common conditions. Lack of lactase causes lactose intolerance, a relatively common abnormality, especially in the elderly. Specifically, lactose intolerance is the most common genetic disorder in the human species, affecting more than 50% of the world's population.

In the state of the art there are different alternatives that seek to allow consumers who have to do without animal milk in their diet, to consume non-dairy substitutes for animal milk of vegetable origin ("milk" based on soy, almond, rice, oatmeal, hazelnut, etc.). These beverages, however, do not include the amount of nutrients (e.g. protein) that animal milk normally has and are products in which multiple additives are added to, among others, try to simulate the texture of animal milk. The inclusion of additives complicates the manufacturing process and is responsible for the end product being seen by the consumer as an artificial and/or unhealthy food.

Various methods for preparing soy "milk" have been described in the state of the art (e.g. EP334057 and EP521331). U.S. Pat. No. 4,894,242 and WO2007011685 describe processes for preparing rice milk and WO9604800 relates to a method for preparing almond milk. Compared to cow's milk, these compositions do not contain lactose or cholesterol.

The egg is a staple in the diet due to its nutritional properties. It stands out for its high content of essential nutrients, which are also bioavailable, and because it provides other elements such as antioxidant substances and unsaturated fats. Eggs are one of the foods richest in protein, and their proteins also provide all the essential amino acids in the exact proportions that the body needs for optimal growth and maintenance of lean, metabolically active tissue. Approximately the whole egg contains 12% by weight of protein, the egg white 11% and the yolk 16%. Egg whites contain minerals like selenium, potassium, magnesium, calcium, and phosphorus; also vitamin B and folic acid. The egg whites have a very low percentage of carbohydrates and have no fat or cholesterol, so they are recommended both for athletes and for those who want to achieve balanced, healthy and low-calorie menus. The egg, the yolk and the egg white are, however, highly perishable products. Furthermore, egg white coagulates when subjected to high temperatures (e.g. temperatures greater than 56° C.). This makes it difficult or even impossible to prepare liquid and stable egg derivatives.

On the market, there are viscous and yellow egg white products, which have a strong smell and taste of eggs (strong bitter aftertaste). There is also, egg white powder, which requires the consumer to add water, although this does not prevent the strong bitter aftertaste (smell and taste of eggs). In fact, in both cases, not even the combination with additives or flavorings (for example, coffee), results in an organoleptically palatable combination, in which the taste and smell of eggs have been mitigated or masked.

US 20150173394 A1 describes an egg-derivate product of neutral flavour, however said product is not a liquid, but a product with foam or gel texture.

The inventors are not aware so far that there is a liquid egg white on the market, white in color and neutral in taste, which can also be consumed directly and shows better storage stability. In this sense, the inventors of the present invention have developed a surprising liquid egg white, with a neutral taste and a white color which can be ultrapasteurized without losing its liquid state. This egg white is a perfect substitute for milk, rich in protein, without fat or cholesterol, and that can be consumed directly.

BRIEF SUMMARY OF THE INVENTION

The present invention relates in a first aspect to egg white characterized in that it is liquid, white in color and has a neutral taste.

A second aspect of the invention relates to a method for preparing the egg white of the first aspect of the invention (method 1 of the invention) comprising the following steps:
- a) heating egg white at a temperature of 40° C. to 55° C.;
- b) acidifying the pH with an acid to a pH of 4 to 7.5;
- c) adding an aminopeptidase and incubating at a temperature of 45° C. to 55° C. for at least 1 hour;
- d) adding minerals, salts and/or lactates and mixing;
- e) diluting the mixture obtained in step d) with water until having a total egg white protein content of 3 to 7% (w/v); and
- f1) homogenizing and then pasteurizing, or
- f2) pasteurizing and then homogenizing.

In a third aspect, the present invention relates to another method for preparing the egg white of the first aspect of the invention (method 2 of the invention), which comprises the following steps:
- a) providing egg white;
- b) diluting the egg white from step a) with water until having a total egg white protein content of 3 to 7% (w/v);
- c) acidifying the pH with an acid, to a pH of 4 to 7.5;
- d) adding minerals, salts and/or lactates; and
- e1) homogenizing and then pasteurizing, or
- e2) pasteurizing and then homogenizing.

In a fourth aspect, the present invention relates to an egg white obtainable by method 1 or 2 of the invention.

In a fifth aspect, the present invention relates to a food composition or a food product comprising the egg white of the first or fourth aspect of the invention.

In a sixth aspect, the present invention relates to the use of the egg white of the first or fourth aspect of the invention, or of the composition or product of the fifth aspect as a food ingredient Other objects, features, advantages and aspects of the present application will be apparent to the person skilled in the art from the following description and appended claims.

DETAILED DESCRIPTION OF THE INVENTION

As used in the present application, the singular forms, e.g. "a", "one" and "the" include their corresponding plurals unless the context clearly indicates otherwise. Unless otherwise defined, all technical and scientific terms used in this document have the meaning commonly understood by one of ordinarily skilled in the art to which this invention belongs.

The present invention relates in a first aspect to egg white characterized in that it is liquid, white in color and has a neutral taste.

The egg white can be chicken or other bird egg white, such as quail, turkey, duck, pheasant and ostrich. Thus, in a particular embodiment of the invention, the egg white is selected from the group consisting of chicken, quail, turkey, duck, pheasant, ostrich egg whites and mixtures thereof. In a preferred embodiment, the egg white is from chicken egg.

In the context of the present invention, "neutral taste" is understood to be one that has no taste. In addition, it does not reproduce bitterness and does not generate aftertaste. In particular, it does not have an egg or egg white aftertaste.

As mentioned above, US20150173394 A1 describes egg-derivate products of neutral flavour, however said products are not a liquid, but products with foam or gel texture. In the preparation method of said products an incubation at 85° C.-95° C. for 10-15 minutes is carrying out, which results in the coagulation of the product. In the present invention, the product does not coagulate, not even at temperatures above 100° C. This is a surprising advantage since the product maintains its liquid state even when subjected to ultrapasteurization treatments.

Figure 1B:
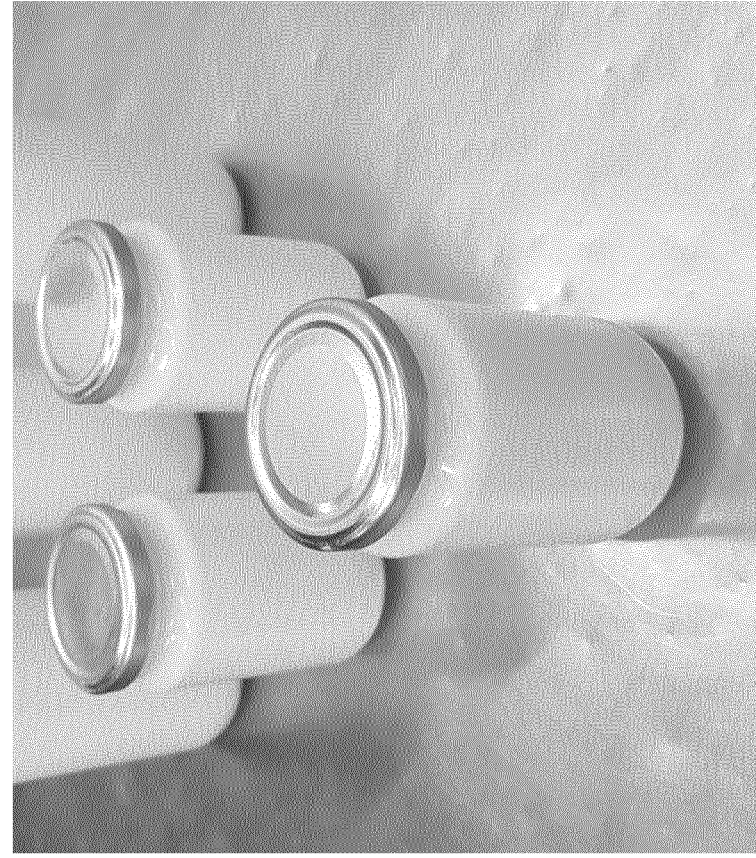
FIG. 1: Photographs of the product of the invention obtained in Example 1, being dosed in a glass (A) and already packed (B). The liquid texture and white color are appreciated.
Figure 1A:
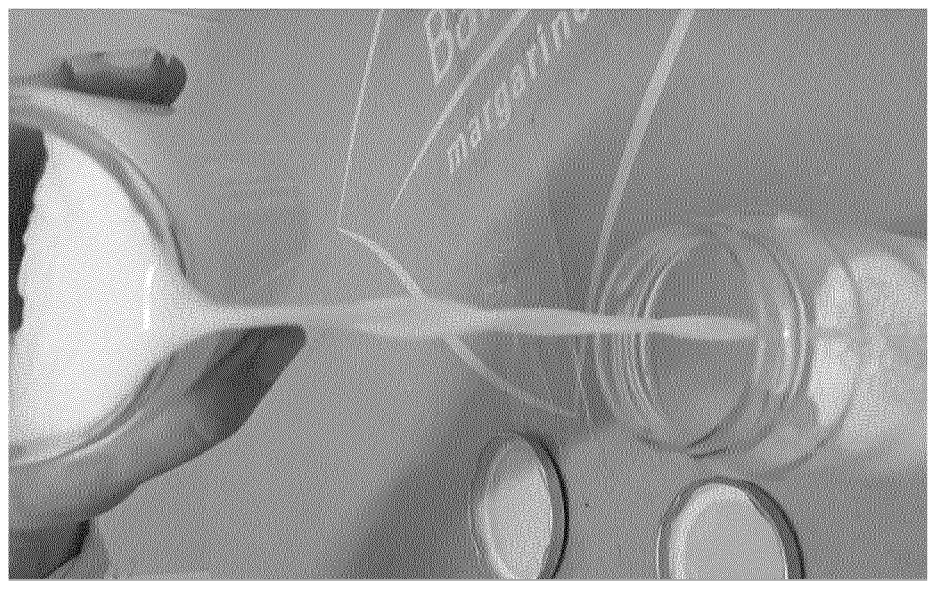

As can be seen in FIG. 1, the egg white of the invention is white and liquid, thus, it mimics the appearance and texture of milk.

In the present invention, milk refers to animal and/or vegetable milk, unless otherwise stated. Animal milk can be skimmed, semi-skimmed or whole milk, preferably it is skimmed or semi-skimmed milk. Animal milk can be of any origin, for example, from cow, sheep, goat, donkey, buffalo. In a preferred embodiment according to any one of the above embodiments, the animal milk is cow, sheep or goat milk, more preferably cow milk. Vegetable milk can be of any origin, for example, soy, rice, almond, oat, hazelnut, etc., In a preferred embodiment according to any one of the above embodiments, the vegetable milk is soy, rice or oat milk, more preferably soy milk.

In a particular embodiment according to any one of the preceding embodiments, the egg white of the present invention has a texture and/or rheology, in particular texture in mouth, similar to milk and/or liquid yogurt. More particularly, it has a texture and/or rheology, in particular texture in mouth, similar to animal milk (e.g. skimmed, semi-skimmed or whole) or to vegetable milk (e.g. soy milk, oat milk, etc.).

The egg white of the present invention has no lumps. Moreover, the egg white of the present invention does not require any fermentation for its preparation. Likewise, it does not require any centrifugation for its preparation (except if the chalazae is removed, what can be done by centrifugation). Like this, advantageously, the egg white of the present invention maintains all the nutrients present in the original egg white.

As shown in the examples, multiple parameters of texture and/or rheology are similar between the egg white of the present invention and milk and/or liquid yogurt. Thus, in particular embodiment according to any one of the preceding embodiments, the texture and/or rheology parameter similar to the milk and/or liquid yogurt is selected from one, various or all of viscoelastic behaviour, complex viscosity, density, particle size distribution, thermal sensitivity (in particular gel strength), and foaming capacity. More particularly, the texture and/or rheology parameter similar to the milk and/or liquid yogurt is selected from one, various or all of viscoelastic behaviour, density, and thermal sensitivity (in particular gel strength). The viscoelastic behaviour is characterized by the elastic modulus (G'), viscous modulus (G"), phase angle (delta ($\delta$)), and tan $\delta$ (G"/G'). There parameters can be determined with a frequency sweep assay, as done in Example 7. This assay also permits to determine the complex viscosity.

In another particular embodiment according to any one of the previous embodiments, the egg white of the invention has a density similar to milk (Example 5). More particularly, it has a density of 1.0 to 1.1 g/ml.

In another particular embodiment according to any one of the previous embodiments, the egg white of the invention has a particle size distribution similar to milk (see Example 5). More particularly, it has the particle size distribution shown in Table 3, when measured according to ISO13320: 2020, as explained in Example 5.

Interestingly, the liquid state of the product of the present invention is maintained even when the product is subjected to high temperatures for long time (see Example 7, section 7.1). The product of the invention has a thermal behaviour similar to milk and liquid yogurt when subjected to thermal treatment, all maintain a very low gel strength. In a particular embodiment, the product of the invention has a gel strength equal or lower than 35 g, more particularly equal or lower than 12 g, when subjected to a thermal treatment (e.g. incubation at 90° C. for 30 min, as described in Example 7).

Advantageously, as shown in Example 7 (section 7.2), the egg white of the invention has a similar, or even improved, foam capacity to animal milk and vegetable milk.

As shown in Example 7 (section 7.3) the product of the invention has viscoelastic properties similar to milk and/or liquid yogurt. Thus, in a particular embodiment according to any one of the previous embodiments, the egg white of the invention has a viscoelastic behaviour similar to milk and/or liquid yogurt. As shown in Example 7, the G', G", and phase angle are within the range of said parameters of animal and vegetable milk, and liquid yogurt.

In a preferred embodiment according to any one of the previous embodiments, the egg white of the invention has a phase angle of 20° to 60° and/or a G"/G' of 0.35 to 1.20. More preferably, it has a G' of 0.20 to 8.00 Pa-s and a G" of 0.20 to 4.00, that is between the G' and G" of vegetable milk and whole milk. These values are given when measured at 22° C. and 5 Hz, particularly as described in Example 7, section 7.3

As shown in Example 7, the product of the invention has a complex viscosity similar to milk and/or liquid yogurt. Thus, in a particular embodiment according to any one of the previous embodiments, the egg white of the present invention has a complex viscosity similar to milk and/or liquid yogurt at rest (5 Hz). These values are given when measured at 22° C. and 5 Hz, particularly as described in Example 7, section 7.4.

Furthermore, the egg white of the present invention is white, simulating even more the appearance of the animal or vegetal (e.g. soy, oat) milk. Thus, in a particular embodiment according to any one of the previous embodiments the appearance is similar to milk (animal and/or vegetal).

In a preferred embodiment according to any one of the previous embodiments, the egg white of the present invention has a texture similar to cow's milk and/or soy milk, as shown in, for example, Example 7.

The egg white of the present invention is ready for consumption, it is a ready-to-eat product. Thus, in a particular embodiment according to any one of the previous embodiments, the egg white is ready for consumption. Thanks to its liquid texture, egg white is a drinkable product. Thus, more particularly, the egg white is drinkable. Surprisingly, the egg white of the present invention can be pasteurized and even subjected to UHT (Ultra High Temperature) treatments, maintaining its liquid state, its color and its neutral taste. It does not coagulate, unlike what happens to egg white heated above 56° C., and other state of the art products such as the one described in US20150173394 A1. Thus, in a particular embodiment according to any one of the previous embodiments, the egg white of the present invention is pasteurized. This product is stable and can be stored in refrigeration where it has a shelf life of at least one month.

In a preferred embodiment, the egg white of the present invention is ultra-pasteurized (e.g. subjected to UHT). Thus, advantageously, a product with improved stability is provided, which does not require refrigeration and can be stored at room temperature. It is a stable product at room temperature. It also has a long shelf life at room temperature, in particular a shelf life of at least 3 months, more particularly 4 to 6 months.

Surprisingly, the egg white of the present invention can be subjected to enzymatic hydrolysis without affecting its liquid state, its color and its neutral taste. Thus, in a particular embodiment according to any one of the previous embodiments, the egg white of the present invention is enzymatically hydrolyzed. Advantageously, this product provides peptides having greater bioavailability and being more digestible than the original proteins of egg white.

Advantageously, in a particular embodiment according to any one of the previous embodiments, the egg white is pasteurized and hydrolyzed. More particularly, the egg white is ultra-pasteurized and hydrolyzed.

As indicated above, the egg white of the present invention is drinkable. Thus, the first aspect of the invention also refers to a beverage or liquid product that comprises or consists of egg white of a white color and of a neutral taste. The particular embodiments described in the first aspect of the invention are applicable to said beverage (e.g. color, taste, (ultra) pasteurized, hydrolyzed, parameter, etc).

This beverage or liquid product does not include dairy derivatives (e.g. lactose, casein), that is, it is a non-dairy beverage or liquid product. In a particular embodiment, this beverage or liquid product is a substitute for milk of animal origin or vegetable milk. In another particular embodiment, this beverage or liquid product is a substitute for liquid yogurt derived from animal milk or liquid vegetable yogurt.

In a particular embodiment, this beverage is liquid as specified above in the first aspect of the invention. More particularly, the beverage or liquid product comprises or consists, preferably consists, of the egg white of the present invention as defined in any one of the embodiments of the first aspect of the invention.

The egg white, beverage or liquid product of the first aspect of the invention can be a substitute of milk or liquid yogurt, so that in a particular embodiment according to any one of the embodiments of the first aspect of the invention, the egg white, beverage or liquid product of the first aspect of the invention is a substitute for animal or vegetable milk. In another particular embodiment, the egg white, beverage or liquid product of the first aspect of the invention is a substitute for liquid yogurt (of animal or vegetable origin).

The main technical advantages of the egg white of the present invention are listed below:
- it is healthy, it is a high-quality protein source without fat or cholesterol;
- has antioxidant properties;
- It is drinkable, which favors its consumption especially by people with chewing or swallowing problems;
- it is lactose and casein-free, which makes it suitable for people intolerant to these proteins;
- it is ready for consumption;
- has improved stability and shelf life, compared to commercially available raw or pasteurized egg white;
- it is an economic product in relation to other protein foods (e.g. fish, meat);
- a liquid yogurt-like texture can be achieved without the need to carry out any fermentation;
- it has a similar, and even improved, foam capacity to milk;
- it can be ultrapasteurized, without losing its liquid state.

These advantages are applicable to the beverage or liquid product that consists of said egg white.

The particular and preferred advantages and embodiments described for the first aspect of the invention are applicable to the rest of the aspects of the invention.

In a second aspect, the present invention relates to a method for preparing the egg white, beverage or liquid product of the first aspect of the invention (method 1 of the invention) that comprises the following steps:

a) heating egg white at a temperature of between 40° C. and 55° C.;

b) acidifying the pH with an acid to a pH of between 4 and 7.5;

c) adding an aminopeptidase and incubating at a temperature of between 45° C. and 55° C. for at least 1 hour;

d) adding minerals and/or mineral salts and/or lactates, and mixing;

e) diluting with water until having an egg white protein content of 3% to 7% w/v; and f1) homogenizing and then pasteurizing, or f2) pasteurizing and then homogenizing.

The percentage of the protein content is given by weight based on the total volume (g/100 mL of the total (mixture obtained in step d)+water)).

With this method, a beverage, liquid product or liquid egg white, being white and with a neutral taste is obtained. Said beverage, product or egg white is ready for consumption. Advantageously, said beverage, product or egg white is pasteurized or ultra-pasteurized, and enzymatically hydrolyzed.

The enzymatic hydrolysis processes of proteins involve a change in the properties of food (related to its digestibility, nutritional quality, sensory quality (such as texture and taste) and health benefits due to the formation of bioactive peptides or the reduction of allergens) that are interesting as a strategy when preparing novel food products, however, it is not always clear that enzymatic hydrolysis leads to an improvement in these properties, which in many cases could be impaired.

On the other hand, a problem frequently associated with the production of protein hydrolysates is the appearance of bitter tastes, depending on the size, sequence and, fundamentally, hydrophobicity of the amino acids that make up the peptides, especially the amino acids valine, leucine, isoleucine, phenylalanine, tyrosine and tryptophan.

Surprisingly, by virtue of the combination of the particular conditions of method 1 of the invention, the inventors have managed to solve the problem of bitterness in protein hydrolysates and have developed a beverage, liquid product or egg white with a neutral taste, which is also liquid and white, and can be (ultra) pasteurized without losing said features.

In another particular embodiment according to any one of the previous embodiments, the pH of step b) is of more than 5 to 7.5, more particularly 6 to 7.5, preferably 6.5 to 7.5 and more preferably of 6.5 to 7. With these pHs and the rest of the conditions of method 1, a product similar to milk and/or liquid yogurt is obtained, as shown in the Examples.

Advantageously, as shown in the examples, the aminopeptidase is an aminopeptidase from *Aspergillus* spp., preferably *A. oryzae*. In a particular embodiment according to any one of the previous embodiments, the aminopeptidase is an aminopeptidase from *Aspergillus* spp., preferably *A. oryzae*. Said enzymes are available and are widely known to those skilled in the art.

In a preferred embodiment according to any one of the above embodiments, the enzyme is a casein protease, more preferably, the enzyme is Hydrozyme™ (ND Pharma, UK), thus obtaining, as shown in the examples, a product similar to liquid milk or liquid yogurt, both in texture and color.

In another particular embodiment according to any one of the previous embodiments, the aminopeptidase is added in an amount of 1 to 4 g per litre of starting egg white, preferably 1 to 3 g per litre.

In another particular embodiment according to any one of the preceding embodiments, the incubation of step c) is carried out for a period of time of 1 h to 3.5 h, preferably 1 to 2.5 h. More particularly, step c) is carried out at 45 to 50° C. Advantageously, as shown in the examples, the conditions described in the last three paragraphs result in an egg white with an ideal neutral texture, color and flavor.

In a particular embodiment according to any one of the previous embodiments, step d) is brought to a temperature of 40 to 60° C., preferably 40° C. to 50° C.

As shown in Example 7, the combination of the particular conditions of this method, in particular the dilution, is essential for obtaining a liquid product. In a preferred embodiment according to any one of the previous embodiments, the dilution of step e) is carried out by adding water so that the protein content is 3%-5.5%, more preferably 4.5%-5.5% w/v. Preferably, osmotized water is added.

Advantageously, with dilution, the protein content and/or fluidity level of the final product can be controlled.

In another particular embodiment according to any one of the previous embodiments, the homogenization is carried out at a temperature of 50° C. to 80° C. Preferably, the homogenization is carried out at a temperature of 50-60° C. or at temperature of 55° C. to 77° C. More preferably, the homogenization is carried out at 60° C. or 73° C.

In another particular embodiment according to any one of the previous embodiments, the homogenization is carried out at a pressure of $50 \times 10^5$ Pa (50 bar) to $400 \times 10^5$ Pa (400 bar).

In another particular embodiment according to any one of the previous embodiments, the pasteurization is carried out at a temperature of 62° C. to 145° C., preferably a temperature of 80 to 145° C., more preferably of 100° C. to 145° C. and most preferably of 110° C. to 145° C.

In another particular embodiment according to any one of the previous embodiments, pasteurization is carried out at a temperature of 62° C. to 140° C., more particularly, from 80 to 140° C., preferably of 100° C. to 140° C., and more preferably of 110° C. to 140° C.

Depending on the temperature of the heat treatment, a pasteurized or ultra-pasteurized product is obtained, with the advantages that each of these modalities provides, which are well known by the skilled in the art.

The person skilled in the art knows for how long to subject the product to heat treatment to achieve (ultra) pasteurization. For example, a pasteurization treatment can last at least 2 minutes, particularly from 2 minutes to 7 minutes. An ultra-pasteurization treatment can last at least 2 seconds, particularly from 2 seconds to 15 seconds.

In a preferred embodiment according to any one of the previous embodiments, the pasteurization is carried out at a temperature of 110° C. to 145° C., more preferably 110° C. to 140° C., for at least 2 seconds, more preferably for a period of time from 2 to 15 seconds, even more preferably 3 to 10 seconds.

In another preferred embodiment according to any one of the preceding embodiments, pasteurization is carried out at a temperature of 80° C. to 95° C., more preferably at 85° C., for at least 180 seconds. Preferably, the pasteurization is carried out for 180 to 300 seconds, more preferably for 180 to 210 seconds.

In another preferred embodiment according to any one of the above embodiments, pasteurization is carried out at a temperature of 62° C. to 79° C., more preferably 72° C., for at least 180 seconds. Preferably, the pasteurization is carried out for 180 to 300 seconds, more preferably for 180 to 210 seconds.

The (ultra) pasteurization temperature affects the shelf life of the product. Surprisingly, the product of the present invention can be subjected to different (ultra) pasteurization temperatures without losing its properties (e.g. texture, color) so it can be prepared to have different shelf life times. As shown in Example 5, the product of the present invention, subjected to UHT, has the same sterility as commercial UHT skimmed milk (less than 1 colony-forming unit per ml), thus achieving a shelf life of 3-6 months at room temperature.

In a third aspect, the present invention relates to another method for preparing the egg white or beverage of the first aspect of the present invention (method 2 of the invention). Specifically, it relates to a method that comprises the following steps:

a) providing egg white;
  b) diluting with water until having an egg white protein content of 3% to 7% w/v;
  c) acidifying the pH with an acid, to a pH of between 4 and 7.5;
  d) adding minerals, salts and/or lactates; and
  e1) homogenizing and then pasteurizing, or
  e2) pasteurizing and then homogenizing.

The percentage of protein is given by weight based on the total volume (g/100 mL of the total (water+egg white)).

As for Method 1, the combination of the particular conditions of Method 2, in particular the dilution is essential for obtaining a liquid product. In a particular embodiment of the third aspect of the invention, the dilution of step b) is carried out by adding water so that the protein content is of 3% to 5.5%, preferably of 4.5% to 5.5% w/v. Preferably, the water is osmotized water.

In a particular embodiment according to any one of the previous embodiments, the pH of step c) is of more than 5 to 7.5. Advantageously, in a preferred embodiment according to any one of the previous embodiments, the pH of step c) is of 6 to 7.5, more preferably of 6.5 to 7.5 and even more preferably of 6.5 to 7. With these pHs and the rest of the conditions of Method 2, a product similar to milk and/or liquid yogurt is obtained, as shown in the Examples.

In another particular embodiment according to any one of the previous embodiments, the homogenization is carried out as defined in any of the embodiments of method 1 of the second aspect of the invention.

In another particular embodiment according to any one of the previous embodiments, the pasteurization is carried out as defined in any of the embodiments of method 1 of the second aspect of the invention.

In a particular embodiment according to any one of the previous embodiments, step e1) is carried out. Homogenization is carried out at a temperature of 50° C. to 70° C., more particularly from 50° C. to 60° C., and pasteurization is carried out at a temperature of 62° C. to 72° C. More particularly, pasteurization is carried out for at least 180 seconds, preferably 180 to 300 seconds, more preferably 180 to 210 seconds.

In another particular embodiment according to any one of the previous embodiments, step e2) is carried out. Pasteurization is carried out at a temperature of 62° C. to 72° C., and then homogenization is carried out at a temperature of 50° C. to 66° C., more particularly 50° C. to 60° C. More particularly, pasteurization is carried out for at least 180 seconds, preferably 180 to 300 seconds, more preferably 180 to 210 seconds.

In both method 1 and method 2, the egg white from step a) can be raw or pasteurized, preferably it is raw egg white. Likewise, it can be used directly, or in the form of a rehydrated product (previously it has been dehydrated and then rehydrated again), preferably the egg white is used directly without having been dehydrated and rehydrated. In a particular embodiment, the egg white is first subjected to clarification (e.g. centrifugation) to remove the chalazae.

In a particular embodiment according to any one of the previous embodiments of the second and third aspects, the acid used to acidify the egg white selected from the group consisting of tartaric acid, lactic acid, hydrochloric acid, acetic acid and combinations thereof. Preferably the acid is tartaric acid and/or lactic acid, more preferably the acid is tartaric acid, which as shown in the examples results in a suitable product. Since the product of the invention is for human consumption, the acids used and the rest of the ingredients are food grade, i.e. they are suitable for consumption.

In a particular embodiment, according to any one of the preceding embodiments of the second and third aspects of the invention, the method does not comprise any fermentation and/or centrifugation. In particular, the method does not comprise any centrifugation after the acidification step. That is, if the egg white is first subjected to clarification to remove the chalazae, a centrifugation can be used to carried out said clarification but no further centrifugations are carried out, in particular no centrifugation is carried out after the acidification.

In a particular embodiment according to any one of the previous embodiments of the second and third aspects, minerals and/or salts thereof and/or lactates thereof are added. In another particular embodiment according to any one of the previous embodiments of the second and third aspects, 2 g to 10 g, preferably 3-7 g, of minerals, salts and/or lactates are added per litre of the starting egg white. Advantageously, in a particular embodiment said minerals, salts and/or lactates are added in solution, that is, a solution comprising said minerals, salts and/or lactates is added.

In a particular embodiment according to any one of the previous embodiments of the second and third aspects, the mineral is a natural mineral. In another particular embodiment according to any one of the embodiments of the second and third aspects, the mineral is selected from the group consisting of calcium, magnesium, iron, sodium, potassium, zinc and combinations thereof, preferably calcium, magnesium, iron, sodium, potassium, and combinations thereof, more preferably calcium. In another particular embodiment according to any one of the foregoing, the minerals are a mineral concentrate.

In another particular embodiment according to any one of the previous embodiments of the second and third aspects, the salt is selected from carbonate, citrate, pyruvate, sulfate, phosphate and combinations thereof, and preferably it is selected from carbonate, citrate, pyruvate, sulfate, phosphate, and combinations thereof. Preferably, the salts in this paragraph are salts of the minerals mentioned in the previous paragraph. Most preferably, the salt is selected from calcium carbonate, calcium citrate malate, calcium pyruvate, and combinations thereof.

In another preferred embodiment according to any one of the previous embodiments of the second and third aspects, the salt does not comprise NaCl, more preferably it is chloride free quantum satis, and even more preferably it is chloride free.

In another particular embodiment according to any one of the previous embodiments of the second and third aspects, the lactates are selected from calcium lactate, magnesium lactate, ferrous lactate, sodium lactate, potassium lactate, zinc lactate, and combinations thereof, preferably calcium lactate, magnesium lactate, ferrous lactate, sodium lactate, potassium lactate and combinations thereof, more preferably calcium lactate. In another particular embodiment according to any one of the foregoing, the lactates are a lactate concentrate.

In a preferred embodiment according to any one of the previous embodiments of the second and third aspects of the invention, a combination of minerals, mineral salts and mineral lactates is added. More preferably, they are added in solution. Said solution comprises minerals, mineral salts and mineral lactates, more preferably it also comprises double distilled water. Said solutions are available and widely known to the person skilled in the art. In particular, said solution is LactoForce™ (ND Pharma, UK), more particularly, 3-7 ml of LactoForce™ are added per litre of starting egg white.

In a particular embodiment according to any one of the previous embodiments of the second and third aspects of the invention, the method comprises a final additional step of dosing and packaging.

Advantageously, and as explained above, the combination of the steps, order and conditions defined in methods 1 and 2 of the invention results in an egg white that is white, liquid and has a neutral taste with improved stability and improved organoleptic characteristics (e.g. state, texture in the mouth and/or color). Moreover, it maintains the nutritional benefits of the raw egg and in the case of method 1, it increases the bioavailability of the peptides. In fact, the hydrolysis and bioavailability are improved particularly by the initial heating step of Method 1. The product resulting from said methods can also be seen as a beverage or liquid product, in particular non-dairy, comprising or consisting of egg white of a white color and neutral taste with improved stability and with improved organoleptic characteristics (e.g. state, texture and/or color). In a particular embodiment, this beverage is liquid as specified above in the first aspect of the invention. Surprisingly, with the conditions of the method of the invention, products that are similar to animal milk, vegetable milk or liquid yogurt can be achieved. These products are an ideal substitute for milk and liquid yogurt for those intolerant to milk or its components, they also provide a regulable protein content, and have no fat or cholesterol, as explained in the first aspect of the invention.

In a fourth aspect, the present invention relates to the egg white, beverage or liquid product obtainable by the methods defined in the second and third aspects of the invention. Said egg white or beverage is white, liquid and has a neutral taste. Said liquid product is white and has a neutral taste. In addition, it is pasteurized or ultra-pasteurized. The advantages and particular and preferred characteristics of said egg white, beverage and product have been described in the first aspect of the present invention and are applicable to the fourth aspect of the invention.

The egg white of the present invention can be mixed with other ingredients to form a food composition, a food or a food product. Thus, in a fifth aspect, the present invention relates to a food composition comprising the egg white, beverage or liquid product of the first or fourth aspect of the invention. More particularly, said composition is a beverage.

It also relates to a food or food product comprising the egg white, beverage or liquid product of the first or fourth aspect of the invention.

The term "food" or "food product" is used herein in a broad sense and encompasses human food as well as animal food (i.e., a feed). Preferably the food is for human consumption. The food can be in liquid or solid form, depending on the use and/or the mode of application and/or the mode of administration.

In a particular embodiment, said composition or food product comprises the egg white, beverage or liquid product of the first or fourth aspect of the invention as the majority component, more particularly it comprises at least 80%, 85%, 90% or 95% of egg white, drink or liquid product. More particularly, said composition or product is a composition or product that would typically contain animal milk, but in it the animal milk is replaced by the egg white, beverage or liquid product of the first or fourth aspect of the present invention.

The composition or food product of the invention may comprise other ingredients. In a particular embodiment according to any one of the foregoing, it comprises a supplement related to health, that is, a food additive intended to provide a health benefit to the consumer. Non-limiting examples of health-related supplements include calcium carbonate ($CaCO_3$), vitamins such as vitamin A, vitamin B2, vitamin B12, vitamin D and vitamin E, zinc, fibers, potassium, phosphorus, fatty acids (for example, omega 3, omega 6), oligosaccharides and/or any other suitable health related supplement.

Another optional ingredient that can be included is a source of calcium. Non-limiting examples of suitable calcium sources are tricalcium citrate and tricalcium phosphate.

Surprisingly, and thanks to its neutral taste, the egg white, beverage or liquid product of the invention can be mixed with any ingredient without adding an egg taste. Thus, in another particular embodiment according to any one of the previous embodiments, the composition and the food product additionally comprise another ingredient, for example, coffee or another infusion (e.g. tea). Thus, for example, if mixed with coffee, it results in a product similar to coffee with milk (see Examples 3 and 5). Advantageously, as mentioned above, the egg white, beverage or liquid product of the first and fourth aspect of the invention has an improved foam capacity so a cappuccino.

In another particular embodiment, the composition or food product comprises the egg white, beverage or liquid product of the invention according to any one of the embodiments of the first and fourth aspects of the invention and a flavoring, particularly a natural flavoring. By "flavoring" is understood any ingredient capable of acting on the senses of taste and smell, but not exclusively, either to reinforce its own (inherent in the food) or by transmitting a specific taste and/or aroma. They are usually products in liquid, powder or paste state, and which can also be defined as substance concentrates. The flavoring agent of the present invention is preferably non-dairy based, in order to prepare a food composition free of dairy derivatives, for example free of casein and/or lactose. One or more flavoring agents can be added. Examples of flavoring agents, sucrose and other non-nutritive sweetening agents or those that raise blood sugar slowly, such as *stevia*, fructose or aspartame, allow the obtaining of functional foods suitable for diabetics. Any other type of sweetening agent such as xylitol, sorbitol, maltitol, fructose and galacto-oligosaccharides can be used. Low calorie sugar substitutes and preferably of natural origin can be used. Examples of flavoring agents are also purees, fruit or vegetable pulps, coloring or flavoring in powder, lyophilized or infusion form. With purees, fruit or vegetable pulps, a product similar to smoothies would be obtained.

In a particular embodiment, the other additional ingredients are added after the homogenization/pasteurization step of method 1 or method 2 (step f1) or f2) in method 1, step e1) or e2) in method 2). More particularly, after said addition, an additional homogenization/pasteurization step is carried out. These embodiments are applicable to the second and third aspects of the invention.

Advantageously, the compositions or food products of the invention are rich in protein, low in fat and cholesterol, and have antioxidant properties, as they comprised the egg white, beverage or liquid product of the first or fourth aspect of the invention, especially when said egg white, beverage or liquid product is the major component of the composition or food product. The antioxidant properties of the food compositions of the invention can contribute to reducing the deterioration of food (oxidation of lipids) that has as consequences alterations in aroma and taste (rancidity), in color, in the loss of certain nutrients and in the formation of potentially harmful substances, which can affect not only the quality of the food but also the safety of its consumption.

As indicated above, the egg white, the egg white beverage, and the compositions or products that comprise them can be consumed directly. They can also be used as ingredients in other culinary preparations. Thus, a sixth aspect of the present invention relates to the use of the egg white, beverage or liquid product of the first or fourth aspect of the invention, or of the composition or food product of the fifth aspect as a food ingredient.

The term "food ingredient", as used herein, refers to a formulation that is or may be added in the preparation of other food products. The food ingredient can be in the form of a solution or as a liquid or solid, depending on the use and/or the mode of application and/or the mode of administration.

Specific examples of the embodiment of the invention are detailed below, which are useful to illustrate the invention without limiting its scope.

EXAMPLES

Example 1. Ultra-Pasteurized Egg White

Raw egg white is used, which is heated at 45° C. The pH is acidified to 7 with food grade tartaric acid. Next, food grade aminopeptidase (casein protease) derived from *Aspergillus oryzae* (Hydrozyme™, ND Pharma), 2 grams per litre of starting egg white, is added and incubated at 45° C. for 100 minutes. After hydrolysis, 4 ml of a solution of minerals, salts and lactates (LactoForce™, ND Pharma) are added per litre of starting egg white and mixed. Subsequently, it is diluted 50% with osmotic water. Finally, it undergoes upstream pasteurization (homogenization and then pasteurization). Specifically, homogenization is carried out at 60° C. and then the product is subjected to a temperature of 136° C. for 4 seconds, thus achieving an ultra-pasteurized product.

The beverage thus obtained consists of egg white being white and having a neutral taste. Surprisingly, it is liquid like milk (see FIG. 1) and does not taste like egg white at all. In addition, it is rich in protein, without fat or cholesterol, and is a stable product at room temperature and has a shelf life of more than 3 months.

Example 2. Pasteurized Egg White

Figure 3:
FIG. 3: Photograph of the product of the invention being poured into a cup of coffee. The product of the invention is the one described in Example 2 and, as can be seen, it is white and liquid like milk. When mixed with coffee, it results in a product similar to coffee with milk.

Raw egg white is used, which is diluted 40% (60% osmotic water is added). Subsequently the pH is acidified to 7 with food grade tartaric acid. Then 3 ml of a solution of minerals, salts and lactates (LactoForce™, ND Pharma) are added per litre of starting egg white and mixed. Subsequently, the product is subjected to upstream pasteurization (homogenization and then pasteurization). Specifically, homogenization is carried out at 60° C. and pasteurization at 70° C. for 3 minutes. The beverage thus obtained consists of egg white being white and having a neutral taste. Surprisingly, it is liquid like milk (see FIG. 3) and does not taste like egg white at all. In addition, it is rich in protein, without fat or cholesterol, and is a stable product when refrigerated for a month.

Example 3. Beverage Similar to Coffee with Milk

Figure 2C:
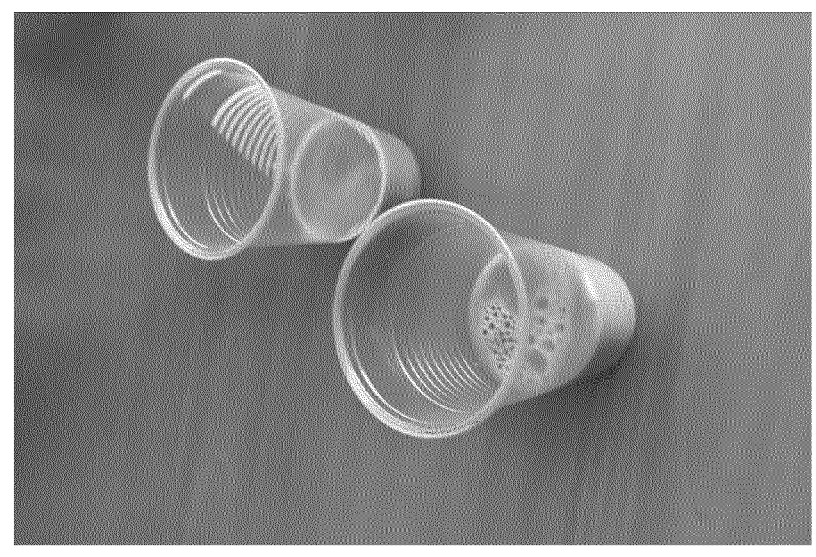
FIG. 2: Photographs showing a glass with the product of the invention alone (glass 1), a glass of coffee (glass 2), a glass of coffee with cow's milk (glass 3). In panel A the coffee and the product of the invention have not yet been mixed. In panel B, coffee is being poured over the product of the invention. Panel C shows the glasses of coffee with milk (3) and coffee with white of the invention (1'). It is observed that the texture and color of the coffee with white of the invention is similar to that obtained by mixing the same amount of coffee with cow's milk. The product of the invention is that described in Example 1.
Figure 2B:
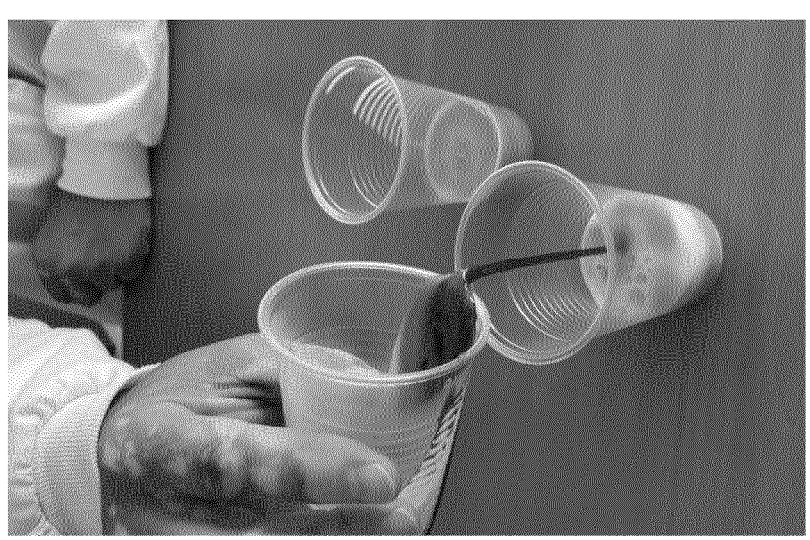
Figure 2A:
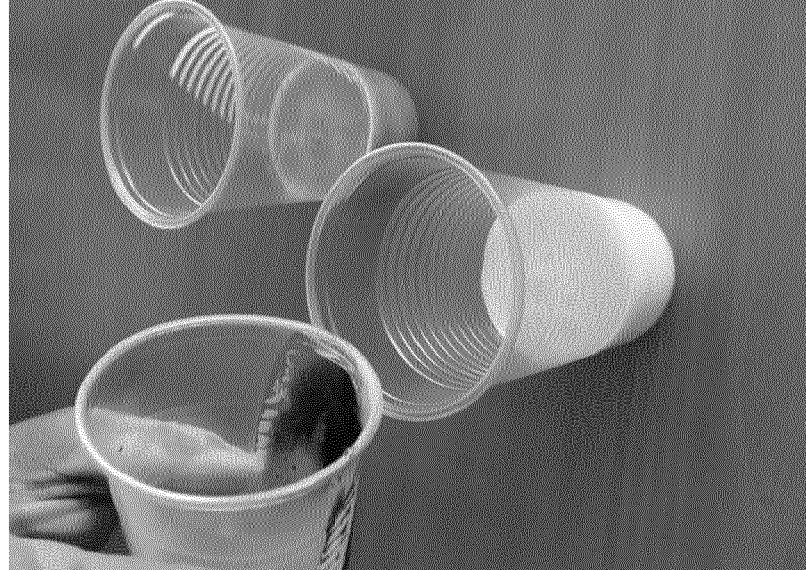

The egg white of Example 1 was prepared and mixed with coffee. Semi-skimmed cow's milk and coffee were mixed in the same proportion. The texture, taste and odor of both preparations were compared. As shown in FIG. 2, the final product is similar to coffee with milk derived from animal milk. Also, the taste and odor were not affected by using the egg white beverage instead of the milk.

The same result was obtained when performing this test with the egg white of Example 2.

Example 4. Egg White Similar to Liquid Yogurt

Raw egg white is used, which is heated at 45° C. The pH is acidified to 4.5 with food grade tartaric acid. Next, food grade aminopeptidase derived from *Aspergillus oryzae* (Hydrozyme™, ND Pharma), 2 grams per litre of starting egg white, are added and incubated at 45° C. for 150 minutes. After hydrolysis, 4 ml of a solution of minerals, mineral salts and lactates (LactoForce™, ND Pharma) are added per litre of starting egg white and mixed. Subsequently, it is diluted with osmotized water until obtaining 5% protein in the total volume (w/v). Finally, it undergoes upstream pasteurization (homogenization and then pasteurization). Specifically, homogenization is carried out at 60° C. and then the product is subjected to a temperature of 85° C. for 210 seconds, thus achieving a pasteurized product. A liquid egg white similar to liquid yogurt, being white and having a neutral taste is obtained. Advantageously, a liquid yogurt texture is achieved without the need for ferments. In addition, it is a product rich in protein, without fat or cholesterol, and stable at controlled room temperature for more than 30 days.

Example 5. Ultra-Pasteurized Egg White 5.1. Preparation

Raw egg white is used, which is heated at 47° C. The pH is acidified to 6.8 with food grade tartaric acid. Next, food grade aminopeptidase (casein protease) derived from *Aspergillus oryzae* (Hydrozyme™, ND Pharma), 2 grams per litre of starting egg white, are added and incubated at 47° C. for 150 minutes. After hydrolysis, 3 ml of a solution of minerals, salts and lactates, LactoForce™, ND Pharma are added per litre of starting egg white and mixed. Subsequently, it is diluted 70% with osmotic water (30% hydrolyzed egg white, 70% osmotic water). Finally, it undergoes direct UHT and downstream homogenization. Specifically, the UHT treatment is carried out at 145° C. for 4 seconds and then the product is homogenized at 70° C. The homogenization pressure was 250/50 bar and the outlet temperature was 20° C. The product obtained was packed in cabin, in 500 ml bottles and stored at room temperature.

The beverage thus obtained consists of liquid egg white, being white and having a neutral taste. Different parameters of said product were characterized and compared with those of commercial UHT skimmed milk (Pascual Quality).

5.2. Physicochemical Analysis

The content of total solids, protein and fat of the product of the invention and of UHT skimmed milk was determined. The results are shown in Table 1.

TABLE 1

| Parameter | UHT hydrolyzed egg white | UHT skimmed milk | Method |
|---|---|---|---|
| Total solids | 3.33% | 9.16% | Oven drying according to ISO 6731 |
| Protein | 3.02% | 3.27% | Kjeldahl, according to ISO 8968-1 standard |
| Fat matter | 0.00% | 0.26% | Rose-Gotlieb, according to ISO 1211 |

The UHT hydrolyzed egg white of the invention does not contain fat. However, milk contains 0.26% fat and, in particular, saturated fat (0.18% approximately).

Although it does not appear in this table, it does not contain sugars and, therefore, lactose. The total solids of skimmed milk and egg white do not significantly influence texture. In the case of skimmed milk, most of the total solids in skimmed milk correspond to lactose (5.0% according to the manufacturer's nutritional declaration), which provides some sweetness to the milk, but almost no texture. Normally the more dissolved solids, the higher the viscosity of the product. In the case of hydrolyzed egg white, despite having less solids (it has no fat or lactose) the viscosity is similar to that of skimmed milk (see below).

Skimmed milk has a slightly higher protein content, although the protein content of UHT egg white can be adjusted upwards to equalize this component, making a lower dilution with the osmotic water.

5.3. Density

Density was analyzed with a 50 ml TQC VF 2098-367 pycnometer (ISO 2811) at 20° C. Results are shown in Table 2.

TABLE 2

| | Density | |
|---|---|---|
| Parameter | UHT hydrolyzed egg white | UHT skimmed milk |
| Density | 1,008.04 kg/m³ | 1,032.02 kg/m³ |

UHT egg white has a lower density than skimmed milk. In part, this is due to the sugar (lactose) content of skimmed milk, which increases its density. However, this difference is not perceptible by the consumer and a density similar to that of cow's or vegetable milk can be considered since the usual densities of dairy or vegetable-based beverages vary between 1,000 and 1,100 kg/m³.

5.4. Particle Size

Particle size data were determined with Mastersizer 2000 (Malvern Instruments), according to ISO 13320:2020, and are listed in Table 3:

TABLE 3

| | Particle size distribution values | | | |
|---|---|---|---|---|
| Sample | D (4,3) | d(0,1) | d(0,5) | d(0,9) |
| UHT hydrolyzed egg white | 1.728 | 0.086 | 0.322 | 4.502 |
| UHT skimmed milk | 0.470 | 0.660 | 0.134 | 0.568 |

Although UHT egg white has a slightly higher particle size, this is in low values, similar to other UHT beverages such as oatmeal, rice beverages, etc. In addition, the particle size is not perceived by the consumer, with which the texture in the mouth will be similar to that of animal milk or vegetable milks.

5.5. Microbiological Analysis

A microbiological analysis was carried out by means of the total count of mesophilic aerobes, according to the ISO 4833-1 method. The results are shown in Table 4.

TABLE 4

| | Mesophilic aerobes count | |
|---|---|---|
| Parameter | UHT hydrolyzed egg white | UHT skimmed milk |
| Mesophilic aerobes | <1 cfu/ml | <1 cfu/ml |

The heat treatments of both products make it possible to achieve the same commercial sterility, so no growth of microorganisms is expected in the egg white or in the milk, allowing a shelf life of 3-6 months at room temperature.

Example 6.—Comparative Application Study

Figure 4A:
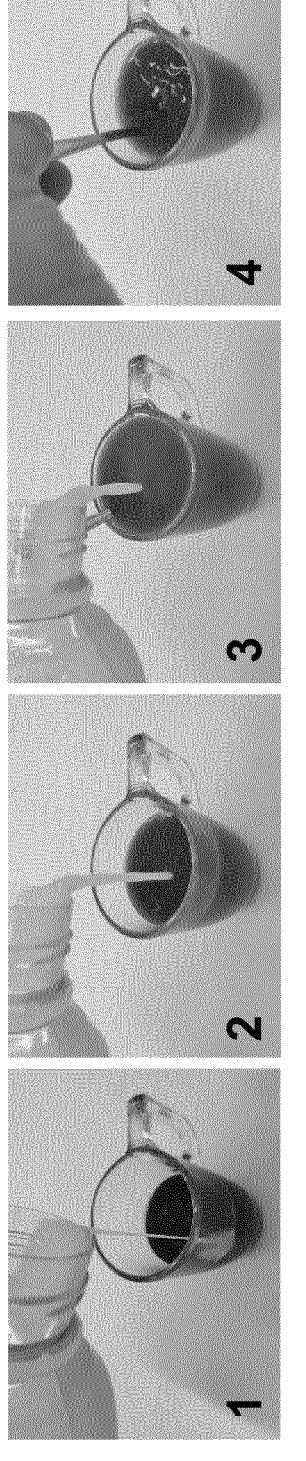
FIG. 4: Photographs of the product of the invention obtained in Example 5 (panel A) and skimmed milk (panel B), being mixed with espresso coffee. Photographs of the following moments are shown: Start of addition (1), 50% UHT egg white and 50% coffee (2), 70% UHT egg white and 30% Coffee (3) and Final mixture (4).
Figure 4B:
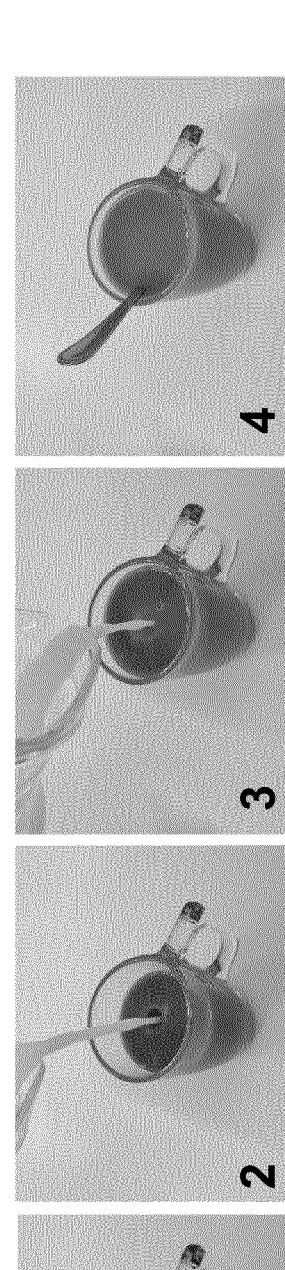
Figure 4B:
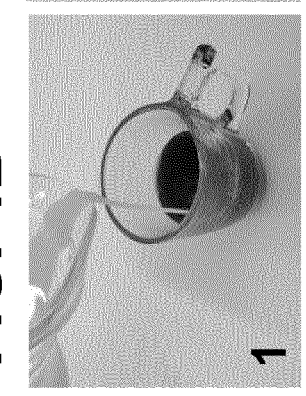
Figure 5A:
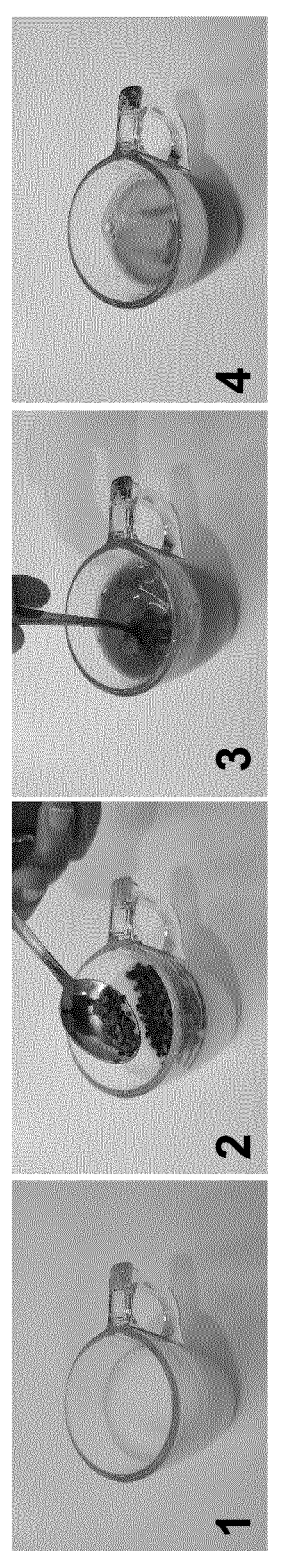
FIG. 5: Photographs of the product of the invention obtained in Example 5 (panel A) and skimmed milk (panel B), being mixed with soluble coffee. Photographs of the following moments are shown: Egg white or milk alone (1), Addition of soluble coffee (2), Stirring (3) and Final mixture (4)).
Figure 5B:
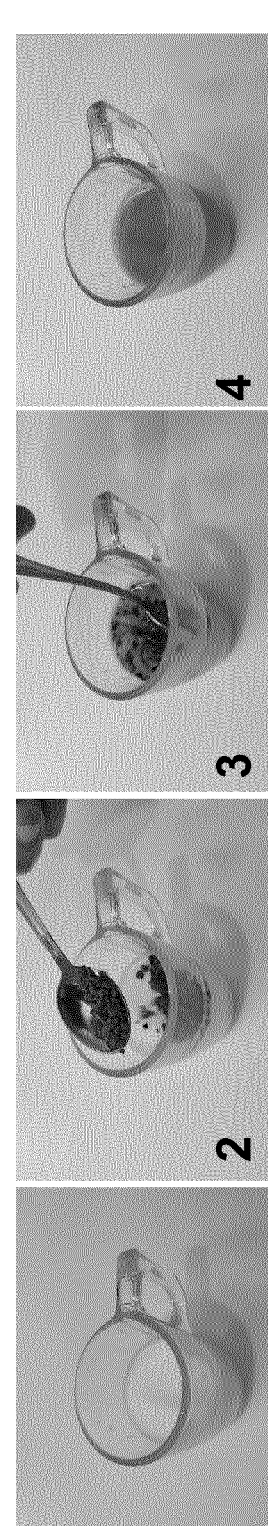
Figure 6A:
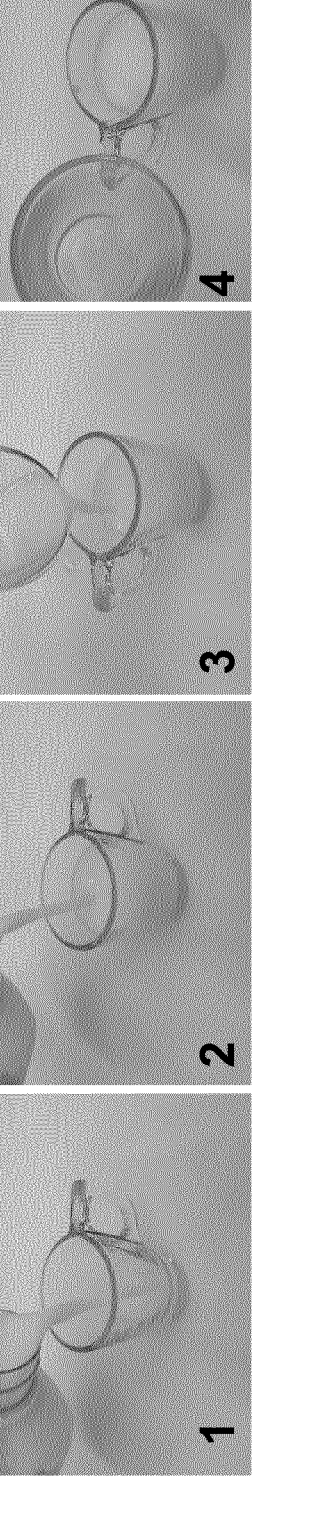
FIG. 6: Photographs of the product of the invention obtained in Example 5 (panel A) and skimmed milk (panel B), being poured and transferred between glasses. Photographs of the following moments are shown: Start of pouring (1), Filling of the glass (2), Transfer of glass (3), End of both glasses (4).
Figure 6B:
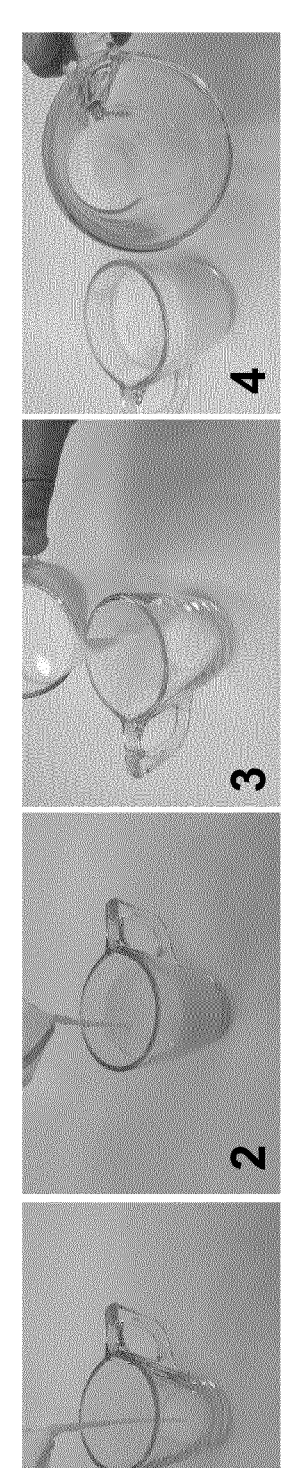

This section shows three practical cases of different times of consumption of UHT skimmed milk and UHT egg white, in which a similar behaviour of both products can be seen:
    A. Addition of milk to espresso (FIG. 4).
    B. Addition of freeze-dried soluble coffee to UHT egg white and UHT milk (FIG. 5).
    C. Filling of glass and transfer of UHT egg white and UHT milk (FIG. 6).
    As shown in FIGS. 4 and 5, the UHT egg white of the present invention behaves like skimmed milk when mixed with espresso or soluble coffee. The resulting food products are equally similar.

Furthermore, as shown in FIG. 6, UHT egg white when poured and transferred behaves like skimmed milk. None of them leaves traces attached to the wall of the glass.

Example 7.—Comparison and Further Characterization

Pasteurized egg white was used to prepare the products depicted in Table 5.

TABLE 5

| | Preparation conditions | | | | | |
|---|---|---|---|---|---|---|
| Prod. | Heat. | Hydrolysis | Salt | Dilut. | Homog. | Pasteuriz. |
| A | 48° C. | 45° C./ 100 min | 4 ml/l | 50% | 60° C. | 136° C./ 4 s |
| B | 48° C. | 45° C./ 100 min | 4 ml/l | No | 60° C. | 136° C./ 4 s |
| C | 47° C. | 47° C./ 150 min | 6 ml/l | 66% | 69° C. | 72° C./ 7 min |

The heating, previous to the acidification, was carried out at 47 or 48° C. as depicted in Table 5. The pH was acidified to 7.0 with food grade tartaric acid. Next, food grade aminopeptidase derived from *Aspergillus oryzae* (Flavorpro 750 MDP, Biocatalyst), 2 grams per litre of starting egg white, was added and incubated at 45 or 47° C. for 100 or 150 minutes as depicted in Table 5. After hydrolysis, 4 or 6 ml of a solution of minerals, salts and lactates, Lacto-Force™, ND Pharma were added per litre of starting egg white and mixed. Subsequently, the mixture was diluted 50% or 66% with osmotic water or not diluted, as depicted in Table 5. Finally, homogenization and pasteurization were carried out. The homogenization pressure was 200 bar for all products but C for which it was 150 bar. The homogenization was carried out first, and then the pasteurization.

Products A and B were packed in cabin, in 500 ml bottles.

Product C was mixed with tricalcium phosphate and vitamin D after the homogenization/pasteurization, and then subjected to UHT treatment (140° C., 4 s) and then, homogenization (65° C., 200/50 bar). Afterwards, the product was packed in cabin, in 500 ml bottles. This product is a supplemented version of the egg white of the present invention.

All products were liquid, white and had neutral flavor.

Besides products A-C, a product according to US 20150173394 A1 was also prepared as follows:

Pasteurized egg white was acidified to 5.5 with concentrated food grade HCl (37%). Then 2 g of aminopeptidase (Flavorpro® 750 MDP, Biocatalyst) per liter of egg white were added and it was incubated in a water bath under stirring at 50° C. for 100 minutes. Afterwards, inactivating the enzyme was carried out by incubation at 95° C. with stirring for 10 minutes. The resulting product is herein referred as product '394.

Figure 7A:
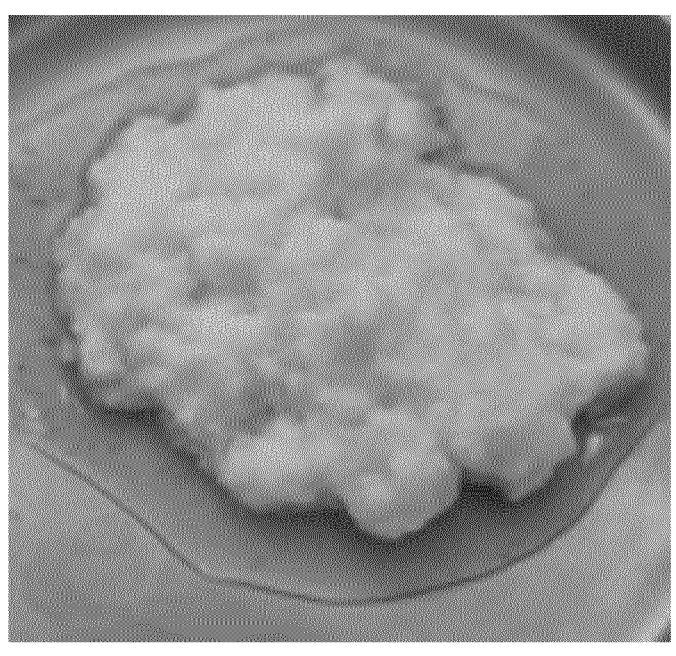
FIG. 7: Photographs of products B (panel A) and '394 (panel B) of Example 7.
Figure 7B:

Products A and C were prepared without incidents. However, product B, in which the dilution step of Method 1 was not carried out started to coagulate at 77-78° C. and was completely coagulated at 79° C. (see FIG. 7, panel A). Likewise, when the dilution was not carried out in Method 2, the product also coagulated (data not shown). Moreover, the product '394 also started to coagulate at 77-78° C. and was completely coagulated at 79° C. (see FIG. 7, panel B).

This demonstrates that the dilution is an essential step in the methods of the present invention and that the product disclosed in US20150173394 A1 is a completely different product to the one of the present invention. Product '394 is not a liquid.

Due to the coagulation, these products (B and '394) could not be included in the next characterizing assays. The rest of the products were further characterized as indicated below, as well as the following commercial products:

Skimmed UHT milk (Pascual)
Whole UHT milk (Pascual)
Soy milk (Vivesoy)
Liquid yogurt (Natural Actimel 0%).

7.1. Thermal Sensitivity

To determine the thermal sensitivity of the products, the inventors chose to analyze the gel strength by performing a penetration test with the aid of a texturometer. The procedure for the determination of gel strength was as follows:

Filling of containers with 100 ml of product.

Thermal treatment at 90° C. for 30 minutes in a thermostat bath and subsequent cooling at 21±1° C.

Penetration analysis of the "gel" formed in a TA-XTplus texture analyzer from Stable Micro Systems, using a 12.7 mm cylindrical probe, a penetration speed of 1 mm/s and a penetration distance of 30 mm, and taking the firmness as the force obtained at that penetration distance.

All tests were performed at 22° C. in triplicate.

This test measures the force required to penetrate the cylindrical probe into the product. During this penetration, the force decreases at a point where the gel breaks. The firmness of the product is taken as the force obtained after a 30 mm penetration into the product (should be in N, but simplified to g).

TABLE 6

| Gel strength results | |
| --- | --- |
| Product | Gel strength (g) |
| A | 6.64 |
| C | 9.9 |
| Skimmed milk | 4.4 |
| Whole milk | 5.6 |
| Soy milk | 4.6 |
| Liquid yogurt | 5.2 |

As shown in Table 6, with the coagulation heat treatment conditions used, all commercial products, with the exception of pasteurized egg white, have a very low gel strength, maintaining a liquid state. The same occur with all the products according to the invention. Thus, it is clear that the products of the invention are liquids, which maintain their liquid state even when subjected to high temperatures for long time (as indicated by the very low gel strength).

Moreover, it is clear that the products of the present invention cannot be considered similar to other egg derived products which have gel texture and a much higher gel strength. In fact, in the present assay, pasteurized liquid egg white (Pascual) shows a gel strength of 501.8 g.

Thus, the product of the invention has a thermal sensitivity similar to milk and liquid yogurt. Said thermal sensitivity is characterized by a very low gel strength, as the one of milk and liquid yogurt. This similar thermal sensitivity is even maintained when the product is supplemented with calcium and vitamin D, as many commercial milks are nowadays supplemented.

7.2. Foaming Capacity

The determination of the foaming capacity of the products, as well as the stability of the foam obtained, is based on the analysis of the overrun and the volume of product drained after aeration.

The following assays were carried out:

Mounting/aeration of 600-700 ml of sample at room temperature (21±1° C.) in a Hobbart mounter for 3 minutes at speed 3.

Determination of product density before and after aeration using 50 ml pycnometer, and calculation of the overrun of each sample. The overrun indicates the amount of air incorporated into a product after an aeration process. For example, an overrun of 100 means that the product doubles its volume after aeration, or its density is reduced by half.

% overrun was determined by the weight of the product contained in the container of the 50 ml pycnometer. The formula used was:

$$\% \text{ Overrun} = ((Wt. \text{ liquid} - Wt. \text{ foam}) / Wt. \text{ foam}) \times 100.$$

Stability analysis:

Glass tubes, graduated from 0 to 30 ml, are filled with 45 ml of sample and left to stand for 70 minutes, After this time, drainage of the aqueous phase is measured as drained volume, The product is left to stand until the liquid is completely drained, and the % of the drained volume at 70 minutes is calculated with respect to the initial volume used.

TABLE 7

| Foam Capacity Results | | |
| --- | --- | --- |
| Product | Drained volume (ml) | Overrun % |
| A | 10 | 74.2 |
| C | 2 | 88.1 |
| Skimmed milk | 5 | 75.0 |
| Whole milk | 45 | 0.2 |
| Soy milk | 9 | 67.0 |
| Liquid yogurt | 45 | 8.1 |

As shown in Table 7, product C has higher foaming capacity than any of the commercial products and product C. Product A has a similar foaming capacity as skimmed milk.

As for the stability of the foam formed, product C is the one which better maintains the foam, even better than skimmed milk, whereas product A maintain it as soy milk.

Thus, the products of the invention have similar or even improved foaming capacity than milk and liquid yogurt. This is a very important advantage for those applications in which a stable foam is desired, e.g. when preparing a cappuccino.

7.3. Viscoelastic Behaviour

In order to study the rheological behaviour of the samples, frequency sweeps between 5 and 50 Hz were carried out with an AR-G2 stress-controlled rheometer, T.A. Instruments, equipped with a Peltier temperature control system.

The samples were deposited between two parallel plates (d=60 mm) and 1 mm distance between the plates is selected.

All tests were performed with a strain amplitude that is within the linear viscoelastic regime of each specimen by means of the of each specimen by performing frequency sweeps. All tests are tests were carried out at 22° C.

Figure 8:
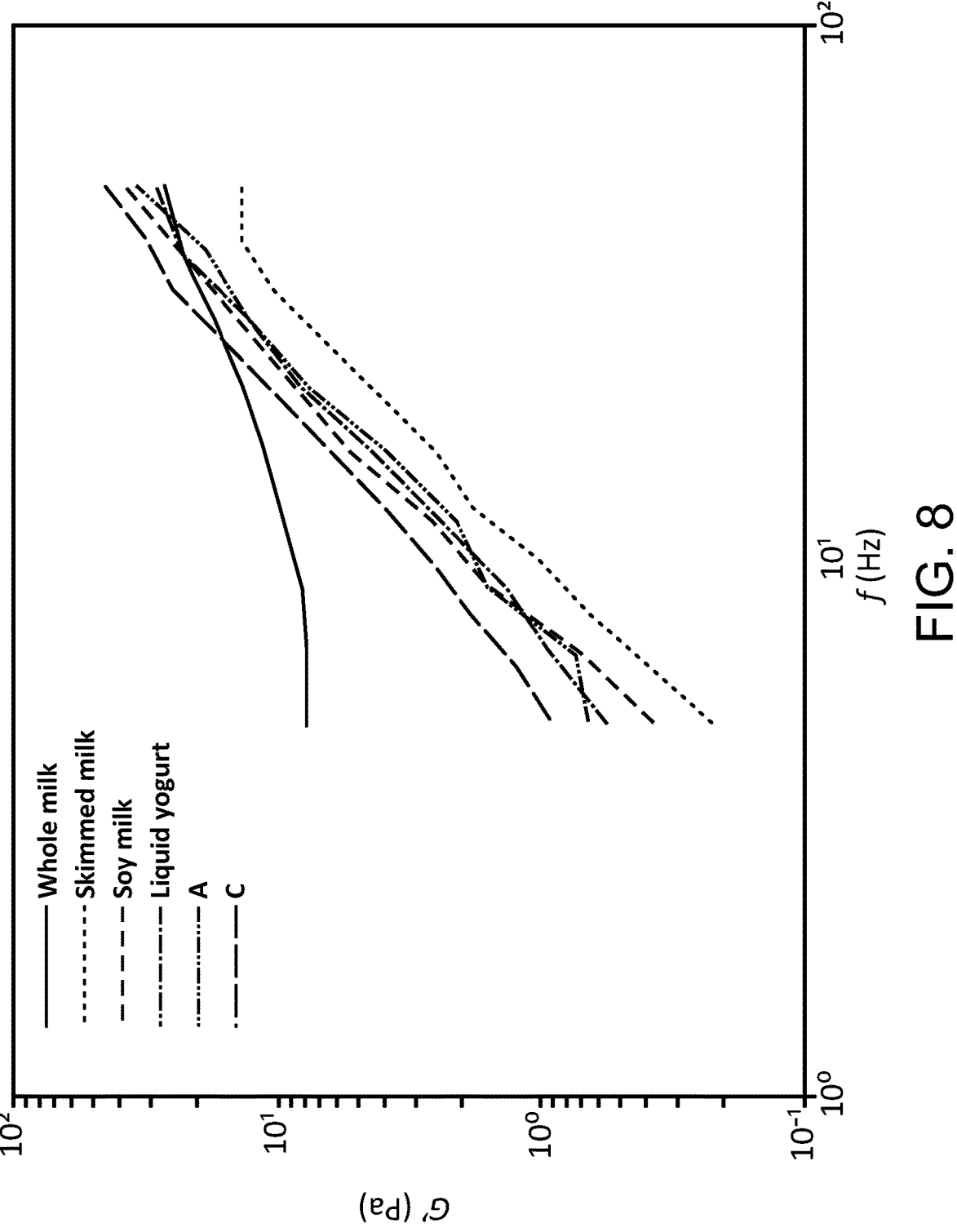
FIG. 8: Graph representing the results of Example 7.3 as elastic modulus (G') versus frequency (Hz).
Figure 9:
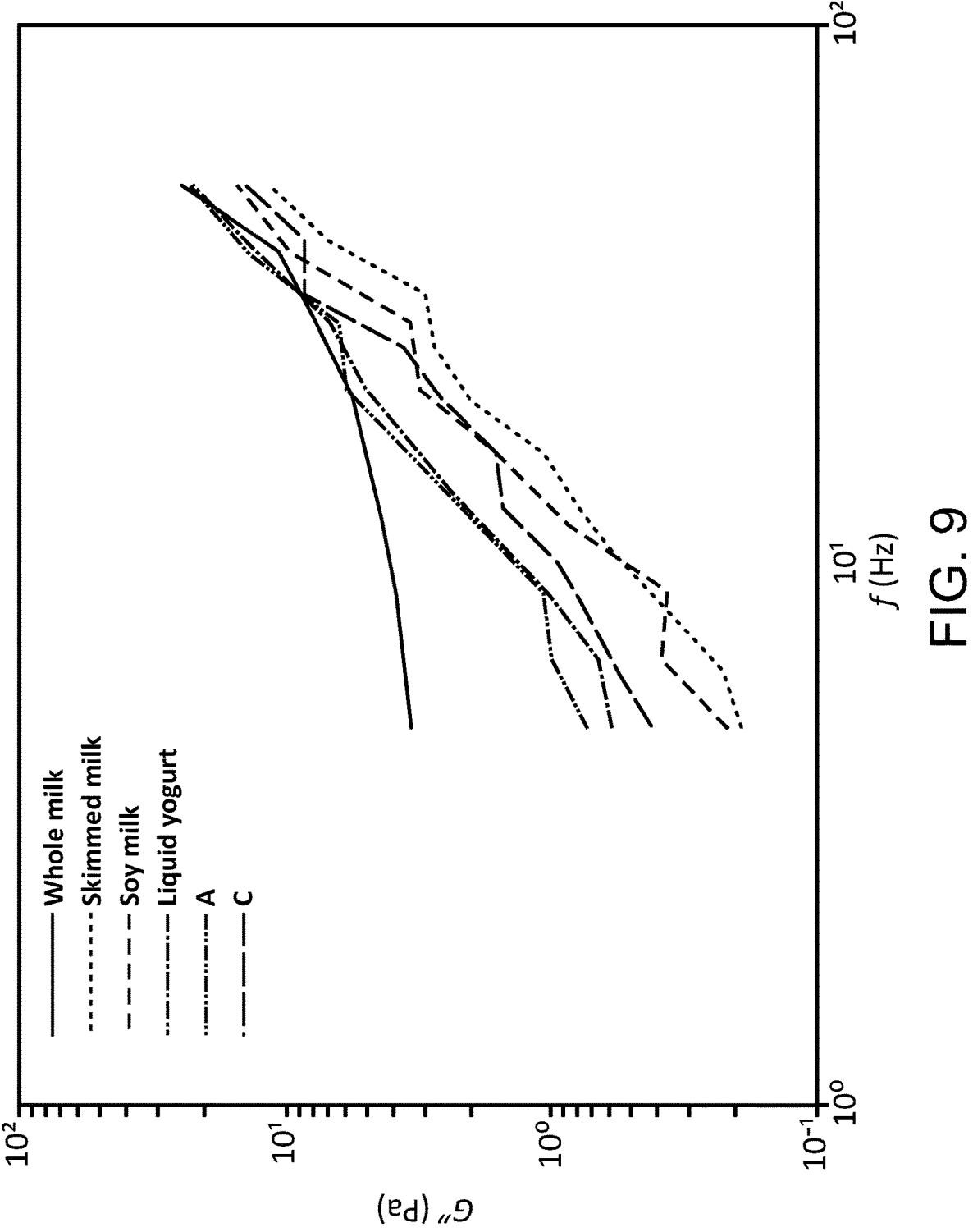
FIG. 9: Graph representing the results of Example 7.3 as viscous modulus (G") versus frequency (Hz).

The results are shown in FIGS. 8 and 9.

The frequency sweep makes it possible to determine the viscoelastic properties of the sample as a function of the time scale. The term viscoelasticity is important because it implies that most materials are neither completely solid nor completely liquid, i.e. they show both viscous and viscous characteristics.

Therefore, by studying the elastic modulus (G'), viscous modulus (G"), and the phase angle (delta, $\delta$), it is possible to establish either the gel-solid character or the liquid behaviour of the material. The modulus G' is used as a measure of the elastic component of the sample and similarly, G" describes the viscous component. The phase angle can be calculated from the equation:

$$\text{Tan}\delta = G'' / G'$$

TABLE 8

| Rheology Results: Viscoelastic behaviour at 5 Hz | | | | |
| --- | --- | --- | --- | --- |
| Product | G' (Pa) | G" (Pa) | G"/G' | $\delta$ (°) |
| A | 0.94 | 0.43 | 0.46 | 24.6 |
| C | 0.67 | 0.75 | 1.12 | 48.2 |
| Skimmed milk | 0.23 | 0.20 | 0.87 | 41.0 |
| Whole milk | 7.91 | 3.48 | 0.44 | 23.7 |
| Soy milk | 0.38 | 0.22 | 0.58 | 30.1 |
| Liquid yogurt | 0.59 | 0.61 | 1.03 | 46.0 |

Therefore, if the drink is of the elastic type (G'>>G") the phase angle ($\delta$) will be close to 0°. On the contrary, if the beverage is of the viscous liquid type (G">>G') the phase angle ($\delta$) will be close to 90°. Thus, the greater the phase angle ($\delta$), the greater the liquid character of the beverage.

Normally foodstuffs have an intermediate behaviour, so they have phase angle values between 0° and 90°.

According to the results obtained, product C is the UHT product with the highest phase angle ($\delta$), which indicates that it is the beverage with the highest viscous liquid character of the commercial UHT samples, although all of the products of the invention have viscous liquid values.

7.4. Complex Viscosity

Once the viscous liquid behaviour of the products of the invention was confirmed, their viscosity was studied.

Generally, for liquid foodstuffs, the viscosity varies according to the conditions in which the product is at the time of measurement, such as temperature or its state: at rest or flowing. By taking measurements at 5 Hz, it is possible to know the behaviour of the beverage over long periods of time (at rest).

Based on the G' and G" data obtained in the frequency sweep assay of section 7.3, the complex viscosity ($\eta^*$) was calculated as follows:

$$G^* = \sqrt{(G')^2 + (G'')^2}$$

$$\eta^* = G^* / \omega$$

wherein $\omega$ is the angular frequency ($\omega$=frequency×2$\pi$).

At a frequency of 5 Hz, the complex viscosities are the ones shown in Table 9.

TABLE 9

| Rheology Results: Complex viscosity at 5 Hz | |
| --- | --- |
| Product | $\eta^*$ (Pa · s) |
| A | 0.033 |
| C | 0.032 |
| Skimmed milk | 0.010 |
| Whole milk | 0.028 |
| Soy milk | 0.014 |
| Liquid yogurt | 0.027 |

The results obtained in the studies show that the UHT commercial milk drinks, the liquid yogurt and the product of the invention have a viscosity at 5 Hz that makes them similar to liquid fluids, with slight differences between them, but perceived as similar by consumers at the moment of ingestion (values obtained at 90 Hz, data not shown).

The invention claimed is:

1. Egg white characterized in that it is liquid, white in color and has no egg or egg white aftertaste, has a viscous modulus/elastic modulus (G"/G') ratio of 0.35 to 1.20, when measured by frequency sweep assay at 22° C. and 5 Hz, and a gel strength equal or lower to 35 g when subjected to thermal treatment at 90° C., and which is pasteurized at a temperature of 62° C. to 145° C.

2. Egg white according to claim 1, which is pasteurized at a temperature of 80° C. to 145° C.

3. Egg white according to claim 1, which is ultra-pasteurized at a temperature of 100° C. to 145° C. or at a temperature of 110° C. to 145° C.

4. Egg white according to claim 1, which is ready to be consumed.

5. Egg white according to claim 1, wherein the egg white is enzymatically hydrolyzed.

6. Egg white according to claim 1 in the form of a composition or food product.

7. Egg white according to claim 6, wherein the egg white is the major ingredient of said composition or food product.

8. Egg white according to claim 3, wherein the egg white is enzymatically hydrolyzed.

9. Egg white according to claim 3, in the form of a composition or food product.

10. Egg white according to claim 9, wherein the egg white is the major ingredient of said composition or food product.

11. Method for preparing the egg white of claim 1, the method comprising the following steps:
  a) heating egg white at a temperature of 40° C. to 55° C.;
  b) acidifying the pH with an acid to a pH of 4 to 7.5;
  c) adding an aminopeptidase and incubating at a temperature of 45° C. to 55° C. for at least 1 hour;
  d) adding minerals, salts and/or lactates and mixing;
  e) diluting the mixture obtained in step d) with water until having a total egg white protein content of 3% to 7% w/v; and
  f1) homogenizing and then pasteurizing, or
  f2) pasteurizing and then homogenizing,
  wherein pasteurization is carried out at a temperature of 62° C. to 145° C.

12. Method according to claim 11, wherein the aminopeptidase is an aminopeptidase from *Aspergillus oryzae.*

13. Method according to claim 11, wherein the aminopeptidase is a casein protease.

14. Method according claim 11, wherein the aminopeptidase is added in an amount of 1 to 4 g per litre of egg white; and/or wherein the incubation of step c) is carried out for a period of time of 1 h to 3.5 h.

15. Method for preparing the egg white of claim 1, the method comprising the following steps:
  a) providing egg white;
  b) diluting the egg white with water until having a total protein content of 3% to 7% w/v;
  c) acidifying the pH with an acid, to a pH of 4 to 7.5;
  d) adding minerals, salts and/or lactates; and
  e1) homogenizing and then pasteurizing, or
  e2) pasteurizing and then homogenizing,
  wherein pasteurization is carried out at a temperature of 62° C. to 145° C.

16. Method according to claim 11, wherein the acid is selected from the group consisting of tartaric acid, lactic acid, hydrochloric acid, acetic acid and combinations thereof.

17. Method according to claim 11, wherein 3-7 g of minerals, salts and/or lactates are added per litre of the starting egg white.

18. Method according to claim 11, wherein the salt does not comprise NaCl.

19. Method according to claim 11, wherein pasteurization is carried out at a temperature of 100° C. to 145° C. or at a temperature of 110° C. to 145° C.

20. Method according to claim 15, wherein pasteurization is carried out at a temperature of 100° C. to 145° C. or at a temperature of 110° C. to 145° C.

* * * * *